(12) United States Patent
Ma

(10) Patent No.: US 7,038,888 B2
(45) Date of Patent: May 2, 2006

(54) PIEZO-ELECTRIC MICROACTUATOR FOR DUAL STAGE ACTUATOR

(75) Inventor: Jianxu Ma, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 124 days.

(21) Appl. No.: 10/458,695

(22) Filed: Jun. 10, 2003

(65) Prior Publication Data
US 2004/0021989 A1 Feb. 5, 2004

Related U.S. Application Data

(60) Provisional application No. 60/399,537, filed on Jul. 30, 2002.

(51) Int. Cl.
*G11B 5/56* (2006.01)

(52) U.S. Cl. .................................. 360/294.4

(58) Field of Classification Search .............. 360/294.4
See application file for complete search history.

(56) References Cited

U.S. PATENT DOCUMENTS

| | | | | |
|---|---|---|---|---|
| 5,233,124 A | * | 8/1993 | Peterson | 360/294.4 |
| 5,325,244 A | * | 6/1994 | Takano et al. | 360/77.03 |
| 6,025,975 A | * | 2/2000 | Fard et al. | 360/294.4 |
| 6,108,175 A | * | 8/2000 | Hawwa et al. | 360/794.4 |
| 6,157,522 A | * | 12/2000 | Murphy et al. | 360/294.6 |
| 6,222,706 B1 | * | 4/2001 | Stefansky et al. | 360/294.5 |
| 6,233,124 B1 | * | 5/2001 | Budde et al. | 360/294.4 |
| 6,268,983 B1 | * | 7/2001 | Imada et al. | 360/294.3 |
| 2002/0008942 A1 | * | 1/2002 | Ezaki et al. | 360/245.3 |
| 2002/0064001 A1 | * | 5/2002 | Shiraishi et al. | 360/294.4 |

\* cited by examiner

*Primary Examiner*—David Davis
(74) *Attorney, Agent, or Firm*—Derek J. Berger

(57) ABSTRACT

A head flexure assembly having a flexure with a built in microactuator is disclosed. The flexure is divided into four portions: a base plate portion for attaching the flexure to an actuator arm; a load beam portion for suspending a transducing head; a parallelogram portion connecting the load beam portion and the base plate portion and allowing for the translational movement of the load beam portion with respect to the base plate portion; and a driving frame portion. The parallelogram portion has two substantially parallel members that attach the base plate portion to the load beam portion. The parallel members limit the movement of the load beam portion relative to the base plate portion to translational movement. The driving frame portion has piezoelectric element that in response to a control signal produces a force, orthogonal to the flexure's longitudinal axis, between the base plate portion and the load beam portion.

18 Claims, 5 Drawing Sheets

PIEZO-ELECTRIC MICROACTUATOR FOR DUAL STAGE ACTUATOR

RELATED APPLICATIONS

This application claims priority of U.S. provisional application Ser. No. 60/399,537, filed Jul. 30, 2002.

FIELD OF THE INVENTION

This application relates generally to data storage devices and more particularly to an actuator assembly for a data storage device.

BACKGROUND OF THE INVENTION

One function of a data storage device such as a disc drive is reliable storage and retrieval of information. Using one common implementation of a disc drive as an example, data is stored on one or more discs coated with a magnetizable medium. Data is written to the discs by one or more transducers, typically referred to as read/write transducers, mounted to an actuator assembly for movement of the transducers relative to the discs. The information may be stored on a plurality of concentric circular tracks on the discs until such time that the data is read from the discs by the read/write transducers. Each of the concentric tracks is typically divided into a plurality of separately addressable data sectors. The transducers are used to transfer data between a desired track and an external environment. During a write operation, data is written onto the disc track and during a read operation the transducer senses the data previously written on the disc track and transfers the information to the external environment. Critical to both of these operations is the accurate locating of the transducer over the center of the desired track.

Conventionally, the transducers are positioned with respect to the disc surfaces by an actuator arm controlled through a voice coil motor. The voice coil motor is responsible for pivoting the actuator arm about a pivot shaft, thus moving the transducers across the disc surfaces. The actuator arm thus allows the transducers to move back and forth in an arcuate fashion between an inner radius and an outer radius of the discs. The actuator arm is driven by a control signal fed to the voice coil motor at the rear end of the actuator arm. A servo control system is used to sense the position of the actuator arm and control the movement of the transducer above the disc using servo signals read from the servo segments on the disc surface in the disc drive. The servo control system relies on servo information stored on the disc. The signals from this information generally indicate the present position of the transducer with respect to the disc, i.e., the current track position. The servo control system uses the sensed information to maintain transducer position or determine how to optimally move the transducer to a new position centered above a desired track. The servo system then delivers a control signal to the voice coil motor to rotate the actuator arm to position the transducer over a desired new track or maintain the position over the desired current track.

As the demand for smaller disc drives increases, so does the demand for higher storage capacities. To meet this demand, manufacturers of disc drives are continually developing smaller yet higher storage capacity drives. Typically, to increase the storage capacity of a disc drive, the density of the concentric tracks on the disc is increased. In order to increase the track density, manufacturers either narrow the width of the concentric tracks or reduce the spacing between tracks. However, these means of increasing track density are limited by the precision of the actuator and voice coil motor assembly.

Manufacturers have developed dual-stage actuators to increase the positioning accuracy of the read/write head. A dual-stage actuator includes the primary stage actuator controlled with a voice coil motor (as discussed above) and a microactuator controlled with a driving circuit. The microactuator may include one or more piezoelectric elements attached, coupled, bonded or integrated with the primary actuator. A piezoelectric element usually contains multiple layers of crystals. Applying a voltage potential across a portion of the crystal changes the dimensions of each crystal, and therefore, the piezoelectric element. Modern piezoelectric elements, or devices, are usually constructed of ceramic composites that exhibit piezoelectric characteristics. The ceramic composites are easily formed as thin layers on silicon substrates and integrated into electrical devices, such as microactuators.

Typical piezoelectric microactuators use "bimorph" piezoelectric elements made of two or more opposed piezoelectric strips that operate in opposition, i.e. one is extended while the other is contracted. This allows the elements to bend in response to an applied voltage. Indeed, in typical designs most piezoelectric elements are structural elements of the microactuator and the bending action produced is desired or even necessary for the function of the microactuator. However, bimorph piezoelectric elements are inherently more expensive than single piezoelectric elements to produce.

Accordingly there is a need for a microactuator design that utilizes a single piezoelectric element. The present invention provides a solution to this and other problems, and offers other advantages over the prior art.

SUMMARY OF THE INVENTION

Against this backdrop the present invention has been developed. One embodiment of the present invention includes a head flexure assembly having a flexure with a built in microactuator. The flexure is divided into four portions: a base plate portion for attaching the flexure to an actuator arm; a load beam portion for suspending a transducing head; a parallelogram portion connecting the load beam portion and the base plate portion and allowing for the translational movement of the load beam portion with respect to the base plate portion; and a driving frame portion.

The parallelogram portion has at least two substantially parallel members that attach the base plate portion to the load beam portion. The members may be provided with hinges to assist their movement. The parallel members limit the movement of the load beam portion relative to the base plate portion to translational movement.

The driving frame portion has piezoelectric element that in response to a control signal produces a force, orthogonal to the flexure's longitudinal axis, between the base plate portion and the load beam portion. Embodiments of the driving frame portion may include tabs or lever members to provide attachment points for the piezoelectric element and directing the force. The tabs and members may be attached to either the base plate portion, the load beam portion or both.

These and various other features as well as advantages which characterize the present invention will be apparent from a reading of the following detailed description and a review of the associated drawings.

BRIEF DESCRIPTION OF THE DRAWINGS

FIG. 2b is a plan view showing the perturbed state of the flexure assembly of FIG. 2a.

DETAILED DESCRIPTION

Figure 1:
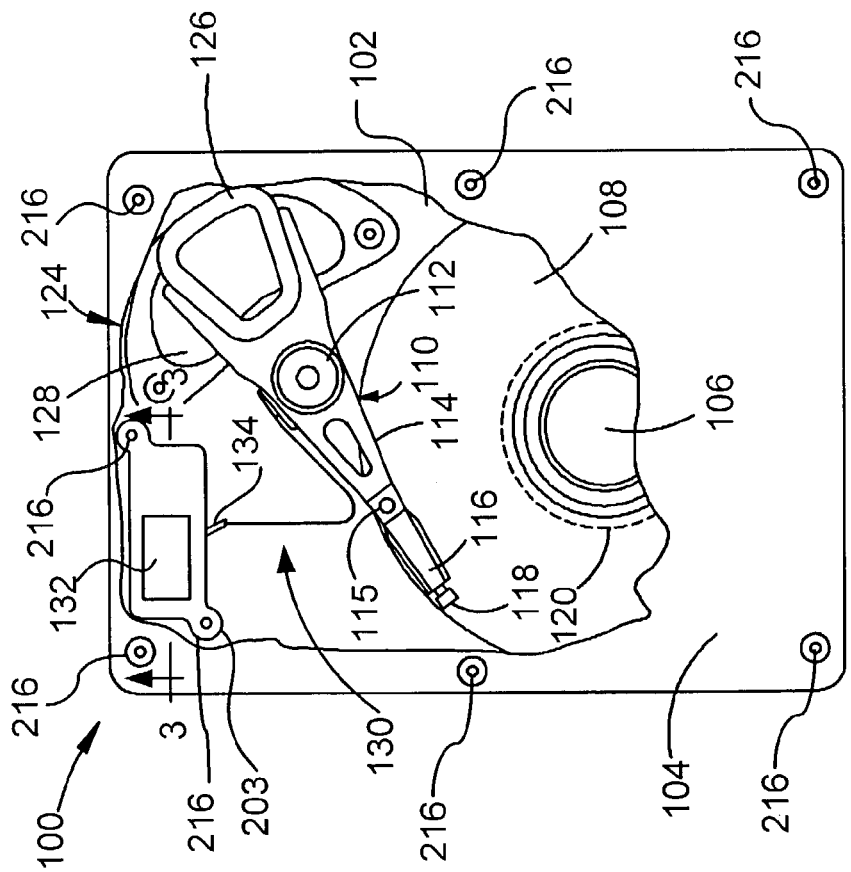
FIG. 1 is a plan view of a disc drive incorporating a preferred embodiment of the present invention showing the primary internal components.

A disc drive 100 constructed in accordance with one embodiment of the present invention is shown in FIG. 1. The disc drive 100 may include a base 102 to which various components of the disc drive 100 are mounted. A top cover 104, shown partially cut away, may cooperate with the base 102 to form an internal, sealed environment for the disc drive in a conventional manner. The components typically include a spindle motor 106 which rotates one or more discs 108 at a constant high speed. Information is written to and read from tracks on the discs 108 through the use of an actuator assembly 110, which in the illustrated embodiment rotates during a seek operation about a bearing shaft assembly 112 positioned adjacent the discs 108. The actuator assembly 110 includes one or more actuator arms 114 which extend towards the discs 108, with one or more flexures 116 extending from each of the actuator arms 114. The actuator arms 114 may be individual, stacked pieces or may be formed out of a single piece, often referred to as an "E-block." The flexures 116 attach to the actuator arms 114 at a connection point 115. Mounted at the distal end of each of the flexures 116 is a head 118 which includes an air bearing slider enabling the head 118 to fly in close proximity above the corresponding surface of the associated disc 108. Generally, the flexure 116, head 118 and any additional components located on the flexure 116 such as a microactuator (not shown), may be referred to here as the head flexure assembly.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 may be secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2A:
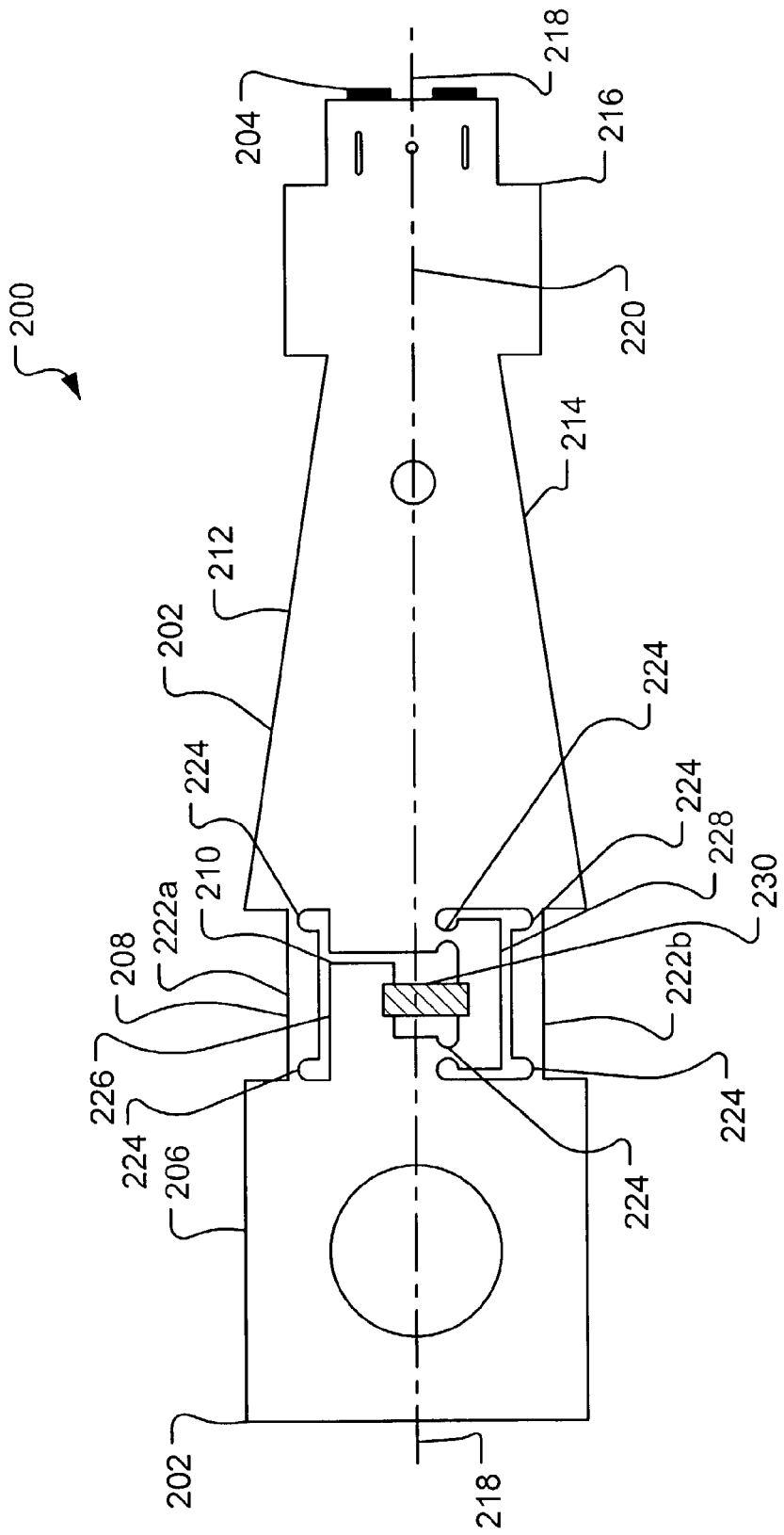
FIG. 2a is a plan view of a flexure assembly in accordance with an embodiment of the present invention.

FIG. 2a shows a plan view of a head flexure assembly 200 having a flexure 202 and one or more transducing heads 204 in accordance with an embodiment of the present invention. The flexure 202 has four main portions: a base plate portion 206; a parallelogram portion 208; a driving frame portion 210, and a load beam portion 212. The base plate portion 206 provides an attachment point allowing the attachment of the flexure 202 to the actuator arm 114 at the connection point 115. The attachment may be effected by a fastener, an adhesive, or any appropriate fastening means and the attachment point will be appropriate for that means.

The load beam portion 212 comprises a load beam body 214 and a head receiving body 216 at its distal end for locating one or more heads 204. The edges and other locations of the load beam portion 212 may be crimped or bent to provide greater stability or stiffness as necessary.

The flexure 202 is shown in FIG. 2a in an unperturbed state. When in an unperturbed state, a line 218 drawn through the center of the base plate portion 206 and the center of the load beam portion 212 defines a longitudinal flexure axis 218. Note also that the load beam portion 206 has its own longitudinal axis 220. In the unperturbed state, as shown in FIG. 2a the load beam axis 220 is parallel and collinear with the longitudinal flexure axis 218.

The base plate portion 206 is attached to the load beam portion 212 by means of the parallelogram portion 208. The parallelogram portion 208 in FIG. 2a has two substantially parallel members 222a and 222b which serve to connect the base plate portion 206 to the load beam portion 212. The parallel members 222a and 222b are also substantially parallel to the longitudinal axis 218, when in the unperturbed state. In the embodiment shown, each member 222a and 222b also includes a hinge point 224 where the member 222a, 222b connects to the base plate portion 206 and to the load beam portion 212.

The motive frame portion 210 is located between the substantially parallel members 222a, 222b of the parallelogram portion 208. The motive frame portion 210 has a tab 226 and a lever member 228. The lever member 228, similar to the substantially parallel members 222a and 222b, connects the base plate portion 206 to the load beam portion 212. The lever member 228 is also shown in FIG. 2a as having two hinge points 224 similar to those on the parallel members 222a and 222b. The lever member 228 is also substantially parallel to the parallel members 222a, 222b and the longitudinal axis 218.

Attached to the tab 226 and the lever member 228 and spanning the space between them is a piezoelectric element 230. The piezoelectric element 230 is mounted such that when a voltage is applied it expands or contracts in a direction substantially orthogonal to the flexure axis 218. When expanding, the piezoelectric element 230 produces a force that drives the tab 226 and the lever member 228 apart. When contracting, the piezoelectric element 230 produces a force that drives the tab 226 and the lever member 228 toward each other. More discussion of movement resulting from the application of force between the tab 226 and the lever member 228 can be found below with respect to FIG. 2b.

In FIG. 2a the head flexure assembly 200 is shown in its unperturbed state, i.e. the piezoelectric element 230 is not deforming to move the load beam portion 212 off the flexure axis 218. In one embodiment, the unperturbed state occurs when there is no voltage applied to the piezoelectric element 230. In an alternative embodiment, the piezoelectric element 212 must have a voltage applied to it to be in the unperturbed state as shown in FIG. 2a.

Figure 2B:
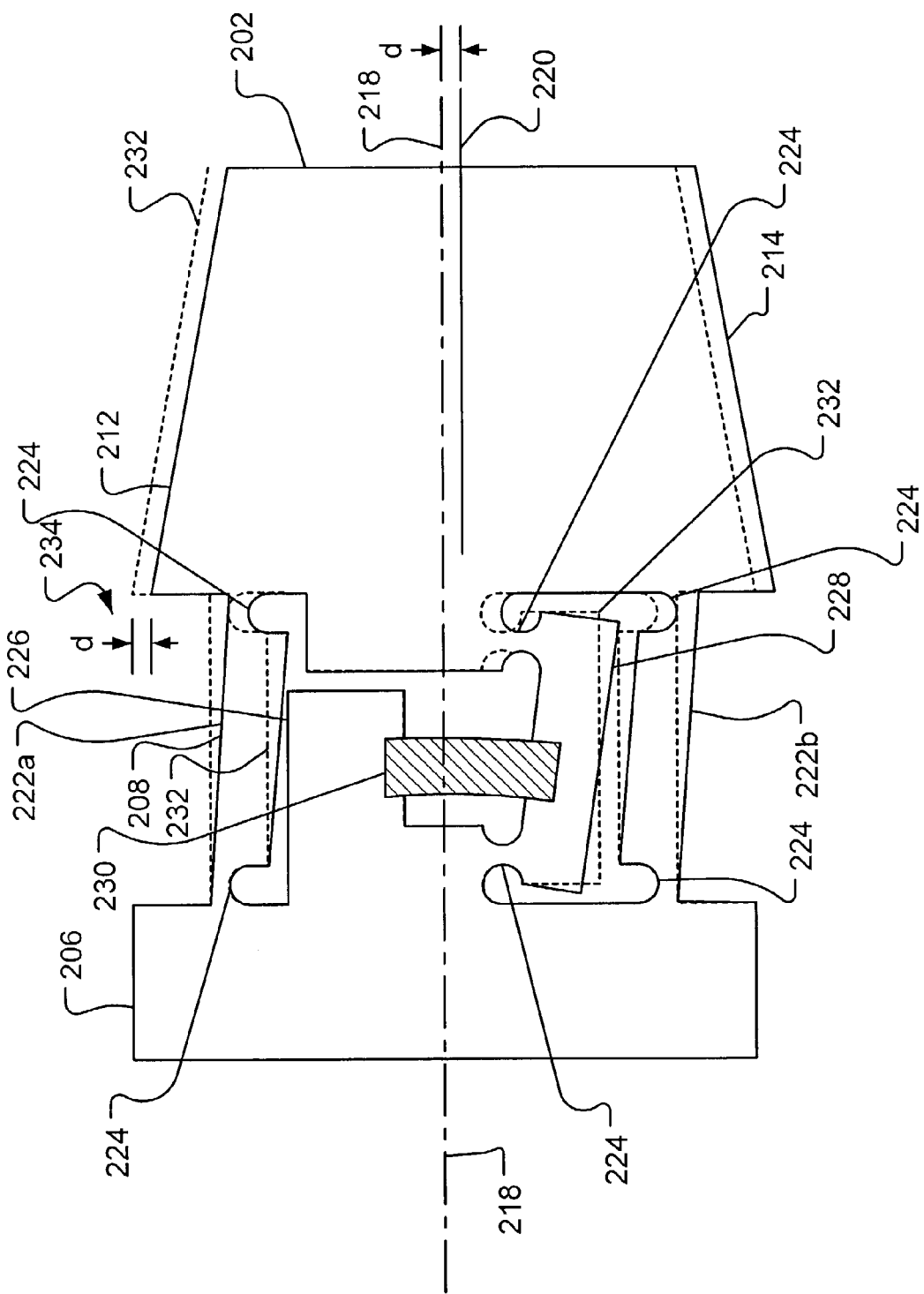

FIG. 2b shows a magnified view of the parallelogram portion 208 and the motive frame portion 210 of the head flexure assembly 200 illustrating the perturbed state wherein the load beam portion 212 has been translationally moved with respect to the longitudinal flexure axis 218. The unperturbed state of FIG. 2a is also shown as a dashed outline 232 of the position of the parallel members 222a and 222b, the lever member 228 and the load beam portion 212. In the embodiment shown a voltage is applied to the piezoelectric element 230 causing it to expand in length by some distance, d, 234. The expansion applies a force that drives the tab 226 and the lever member 228 apart. In response, the parallel members 222a, 222b deflect at the hinge points 224. As a result, the load beam portion 212 moves translationally with respect to the base plate portion 206. The resultant perturbed position of the load beam portion 212 is such that the load beam long axis 220 is displaced the distance, d, away from the flexure axis 218, but the load beam long axis 220 remains substantially parallel to the flexure axis 218.

In the embodiment shown, a piezoelectric element 230 capable of both contraction and expansion is contemplated with respect to the unperturbed state. When contracting, the piezoelectric element 230 creates a force driving the tab 226 and the lever member 228 together. In response, the parallel members 222a, 222b deflect at the hinge points 224 and the load beam portion 212 moves translationally in the direction opposite to that caused by the expansion of the piezoelectric element. The resultant perturbed position of the load beam portion 212 is such that the load beam long axis 220 is translationally displaced some distance away from the flexure axis 218, but the load beam long axis 220 remains substantially parallel to the flexure axis 218.

The embodiment shown in FIGS. 2a and 2b offer several advantages over traditional designs of microactuator-equipped flexures. One is that the flexure 202 may be a unitary construction formed out of a single piece of material such as steel, aluminum or composite. The unitary construction will result in reduced cost for the flexure as a whole. The unitary construction also reduces complexity.

Another advantage is that the single piezoelectric element 230 is not a primary structural element of the flexure assembly 200. Other than loads caused by its own expansion or contraction, the piezoelectric element 230 is under little or no load. Thus it can be made of less material that would be necessary for a piezoelectric element 230 that is a structural element of the flexure assembly 200.

To one skilled in the art, many variations of the above design will be immediately suggested that will retain the advantages of the embodiment shown in FIGS. 2a and 2b. For example, in an embodiment the tab 226 may be connected to the load beam portion 212 rather than the base plate portion 206. The embodiment above may also be provided with a piezoelectric element 230 that only drives the tab 226 and lever member 228 in one direction (i.e. either together or apart, but not both such as a piezoelectric element 230 that is attached so that it can only drive the tab 226 and lever member 228 apart). As another example, a separate spring (not shown) may be provided on the flexure 202 to create more resistance to the force applied by the piezoelectric element 230 when it deforms.

An initial prototype of the embodiment described in FIGS. 2a and 2b was fabricated and tested by the authors. The prototype was fabricated on a conventional flexure, with slider attached, of a hard disc drive using a wire cutting machining process. The piezoelectric element was adhered onto the flexure using epoxy resin. During testing, with an applied voltage of ±10 volts, the stroke of approximately ±0.5 micrometers (µm) was obtained.

Figure 3:
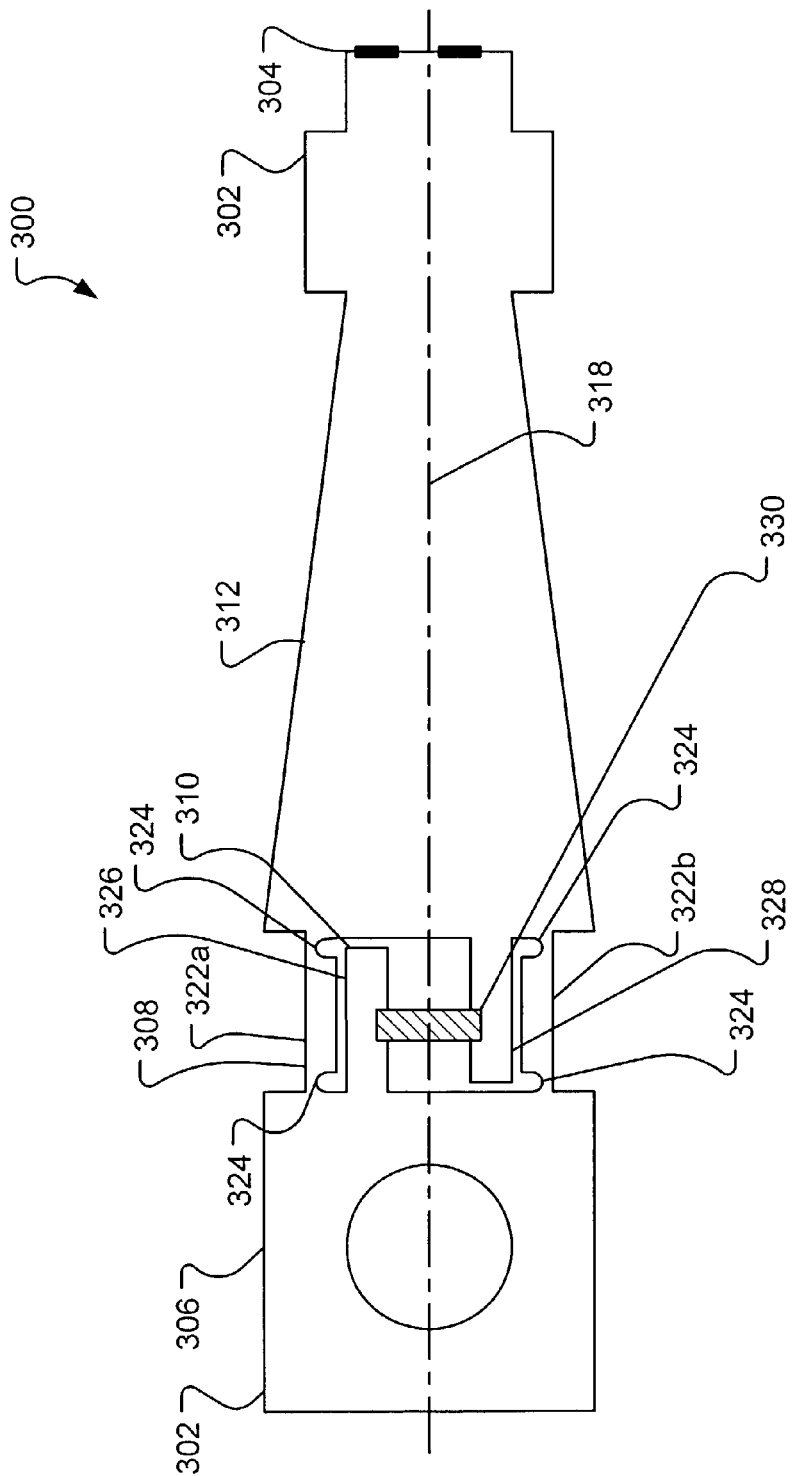
FIG. 3 is a plan view of a flexure assembly in accordance with another embodiment of the present invention.

FIG. 3 presents another embodiment of a head flexure assembly 300 having a flexure 302 and one or more transducing heads 304 in accordance with the present invention. The flexure 302 has a base plate portion 306, a load beam portion 312, a parallelogram portion 308 and a motive frame portion 310. When in an unperturbed state as shown in FIG. 3, a line drawn through the center of the base plate portion 306 and the center of the load beam portion 312 defines a longitudinal flexure axis 318. The parallelogram portion 308 has two parallel members 322a and 322b connecting the base plate portion 306 to the load beam portion 312. The parallel members 322a, 322b are substantially parallel to each other and the longitudinal axis 318 of the flexure 302. The members 322a, 322b are shown as having hinges 324 at each location where they connect to the base plate portion 306 or the load beam portion 312, although in alternative embodiments the hinges 324 are not provided.

The motive frame portion 310 is again located between the parallel members 222a, 222b and the base plate and load beam portions 306, 312. However, in the embodiment shown the lever member 228 of the previous embodiment has been replaced by a second tab 328. The first tab 326, as in the previous embodiment shown in FIGS. 2a and 2b, is attached to the base plate portion 306. The second tab 328 is attached to the load beam portion 312. Attached to the first tab 326 and the second tab 328 and spanning the space between them is a piezoelectric element 330. The piezoelectric element 330 is mounted such that when a voltage is applied it expands or contracts in a direction substantially orthogonal to the longitudinal axis 318. When expanding, the piezoelectric element 330 produces a force that drives the first and second tabs apart. When contracting, the piezoelectric element 330 produces a force that drives the first and second tabs 326, 328 toward each other. In either case, as in the previous embodiment the driving force will cause the load beam portion 312 to translationally move with respect to the base plate portion 306.

Figure 4:
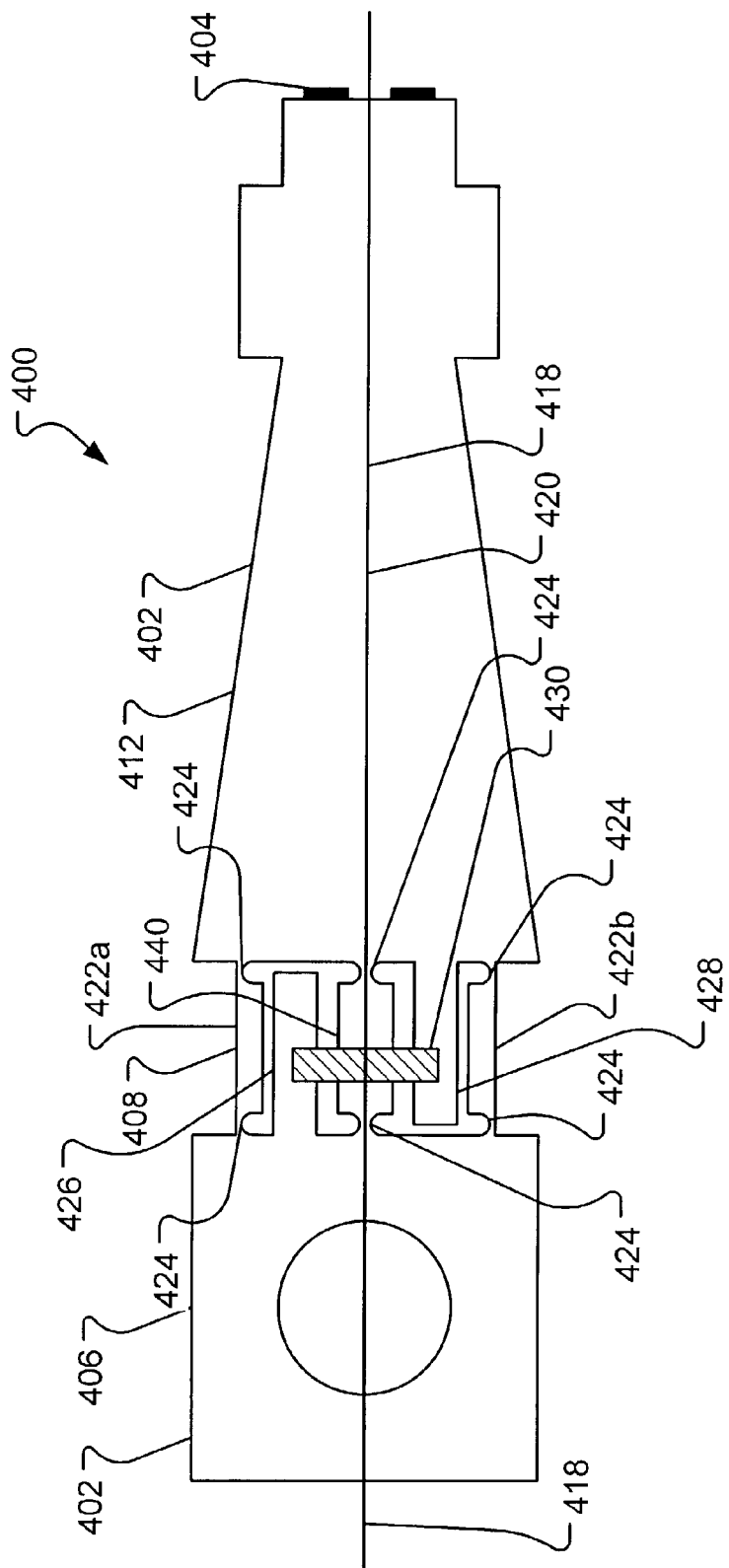
FIG. 4 is a plan view of a flexure assembly in accordance with yet another embodiment of the present invention.

FIG. 4 presents yet another embodiment of a head flexure assembly 400 having a flexure 402 and one or more transducing heads 404 in accordance with the present invention. The flexure 402 has a base plate portion 406, a load beam portion 412, a parallelogram portion 408 and a motive frame portion 410. When in an unperturbed state as shown in FIG. 4, a line 418 drawn through the center of the base plate portion 406 and the center of the load beam portion 412 defines a longitudinal flexure axis 418. The parallelogram portion 408 has two parallel members 422a, 422b attaching the base plate portion 406 to the load beam portion 412. The parallel members 422a, 422b are substantially parallel to each other and the longitudinal axis 418 of the flexure 402. The members 422a, 422b are shown as having hinges 424 at each location where they connect to the base plate portion 406 or the load beam portion 412, although in alternative embodiments the hinges 424 are not provided.

The motive frame portion 410 is again located between the parallel members 422a, 422b and the base plate and load beam portions 406, 412. However, in the embodiment shown the motive frame portion 410 includes first and second tabs 426, 428 and a third member 440, located between the first and second tabs 426, 428. The third member 440 is substantially parallel to the parallel members 422a, 422b and connects the base plate portion 406 to the load beam portion 412. Attached to the first tab 426 and the second tab 428 and spanning (not attached to) the third member 440 and space between the first and second tabs 426, 428, is a piezoelectric element 430. The piezoelectric element 430 is mounted such that when a voltage is applied it expands or contracts in a direction substantially orthogonal to the longitudinal axis 418. When expanding, the piezoelectric element 430 produces a force that drives the first and second tabs 426, 428 apart. When contracting, the piezoelectric element 430 produces a force that drives the first and second tabs 426, 428 toward each other. In either case, as in the previous embodiments the driving force will cause the load beam portion 412 to translationally move with respect to the base plate portion 406.

The third member 440 in the embodiment shown in FIG. 4 is not a lever member in that no force is applied directly to the member. Rather, it provides additional support to the load beam portion 412 by essentially acting as an additional parallel member.

The embodiments described above utilize a single piezoelectric element as means to produce a force between the tab and the lever member and thereby causing the load beam portion to move essentially translationally with respect to the base plate portion. Other means for producing the force are also possible including a second magnetic actuator or an electrically-driven piston or motor that creates a force between the lever member and the tab.

The embodiments described above also position the force-producing means so that the force generated by the force-producing means is substantially in the direction parallel to the rotating disc but perpendicular to the longitudinal axis of the flexure. However, this positioning is not essential to produce the translational movement of the load beam portion with respect to the base plate portion. Because the parallelogram portion limits the movement of the load beam portion with respect to the base plate portion to only translational movement, any force-producing means positioned such that it has some vector force component in the direction perpendicular to the longitudinal axis of the flexure will also cause translational movement of the load beam portion with respect to the base plate portion. The reader will note that for alternative embodiments that do not have the force-producing means substantially orthogonal to the longitudinal axis of the flexure, the tab may no longer be necessary, i.e. the force-producing means is connected to (and applies a force between) either the base plate portion or the load beam portion proper at one end and the lever member at the other end.

It should also be noted that the positioning of the piezoelectric electric element can be adjusted to obtain different amounts of mechanical advantage. This takes advantage of the inherent lever nature of the embodiments. For example, in the embodiment shown in FIG. 2a the closer to the load beam portion that the piezoelectric element is attached on the lever member, the greater the mechanical advantage will be. Thus, resulting in less force being required to achieve the same translation displacement.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the embodiments disclosed above include hinge points on the members. While these hinge points permit facilitate movement and thus permit the use of a smaller piezoelectric element, some or all of the hinges on the members may be omitted without substantially affecting the operation of the flexure. The parallel members may be reinforced, such as at the hinges, to reduce movement away from and toward the disc and improve structural stability. Numerous other changes may be made which will readily suggest themselves to those skilled in the art and which are encompassed in the spirit of the invention disclosed and as defined in the appended claims.

What is claimed is:

1. An elongate flexure comprising:
   a base plate portion for mounting the flexure to a support;
   a load beam portion for supporting a device relative to the support;
   a motive frame portion comprising:
   a tab; and
   a lever member;
   two substantially parallel members connecting the base plate portion to the load beam portion and allowing translational movement of the load beam portion with respect to a longitudinal axis of the flexure,
   the motive frame portion being located between the parallel members; and
   a piezoelectric element that deforms in response to control signals, having a first end attached to the lever member and a second end attached to the tab, such that deformation of the piezoelectric element causes the load beam portion to move relative to the base plate portion.

2. The flexure of claim 1 wherein the flexure is a unitary structure formed from a continuous piece of material.

3. The flexure of claim 1 wherein the two substantially parallel members each have hinge portions where they connect to the base plate portion and the load beam portion.

4. The flexure of claim 1 wherein the tab is connected to the base plate portion.

5. The flexure of claim 1 wherein the tab is connected to the load beam portion.

6. The flexure of claim 1 wherein the first and second ends of the piezoelectric element are fixed by means of an adhesive.

7. The flexure of claim 1 wherein the lever member connects the base plate portion to the load beam portion.

8. The flexure of claim 7 wherein the lever member has a hinge point where the lever member connects to the base plate portion and to the load beam portion.

9. The flexure of claim 1 wherein the lever member is a second tab.

10. The flexure of claim 1 wherein deformation of the piezoelectric element applies a force between the lever member and the tab in a direction that is orthogonal to the longitudinal axis of the flexure.

11. A data storage device, comprising:
    the flexure of claim 1;
    a data storage medium;
    a transducing head for accessing the storage medium, the transducing head being supported by the flexure.

12. The data storage device of claim 11, in which the storage medium comprises a rotatable disc.

13. A head flexure for positioning at least one transducing head over a data track of a rotating, data-storage disc in a data storage device, the head flexure comprising:
   a base plate portion for mounting the flexure to a support;
   a load beam portion of the flexure for supporting the transducing head; and
   means for effecting translational movement of the load beam portion with respect to the base plate portion.

14. The head flexure of claim 13 wherein the means for producing a force includes a single piezoelectric element.

15. In a flexure having a base plate portion, a load beam portion, a parallelogram portion of the flexure having two substantially parallel members connecting the base plate portion to the load beam portion and a motive frame portion of the flexure having a tab and lever member located between the two substantially parallel members, a method for translating the load beam portion relative to the base plate portion comprising the acts of:

applying a force on the motive frame portion in a direction substantially orthogonal to parallel members;
   transferring the force to the load beam portion; and
   translating the load beam portion with respect to the base plate portion via deflection of the parallel members.

16. The method of claim 15 wherein the force is applied between the tab and the lever member.

17. The method of claim 15 wherein the force is transferred by means of the lever member moving with respect to the base plate portion.

18. The method of claim 15 wherein the parallel members limit the movement of the load beam portion with respect to the base plate portion to substantially only translational movement.

* * * * *